United States Patent [19]
Guth

[11] Patent Number: 5,272,315
[45] Date of Patent: Dec. 21, 1993

[54] WELDING PROCESS FOR HARDENABLE OR HARDENED STEEL

[76] Inventor: Bela Guth, Av. Manuel Dias da Silva, 2199-Apt. 501, Salvador, Bahia, Brazil

[21] Appl. No.: 918,359

[22] Filed: Jul. 23, 1992

Related U.S. Application Data

[63] Continuation-in-part of Ser. No. 588,179, Sep. 26, 1990, abandoned.

[30] Foreign Application Priority Data

Dec. 8, 1989 [BR] Brazil .................. PI89 06353

[51] Int. Cl.⁵ .............................................. B23K 9/00
[52] U.S. Cl. .................................................. 219/137 R
[58] Field of Search ........ 219/137 R, 137 WM, 76.12

[56] References Cited

U.S. PATENT DOCUMENTS

| | | | |
|---|---|---|---|
| 3,610,876 | 10/1971 | Bhat | 219/76.12 |
| 4,196,335 | 4/1980 | Ikeda et al. | 219/76.12 |

OTHER PUBLICATIONS

Lyman et al, Editors, *Metals Handbook*, 8th edition, vol. 6, "Welding & Brazing", pp. 187–190, 1971.

*Primary Examiner*—Clifford C. Shaw
*Attorney, Agent, or Firm*—Jones & Askew

[57] ABSTRACT

A cold-welding process that eliminates heat treatment of welds in hardenable steel or hardened steel, alloy steel, high alloy steel, high carbon forged steel, bi-metal union, manganese steel such as Hadfield steel, and so on, without hardening the deposited weld, whereby also the transition area of the deposited weld is not hardened, thus preserving the mechanical and physical characteristics of the basic material, and maintaining the deposited weld fileable and machineable, by using specific AWS-307, AWS-309, AWS-312 and AWS-8018 through 10018 electrodes. The temperature of the welded parts should never exceed 100° C. during the welding process. This control of maximum temperature is obtained by welding a series of relatively short fillets instead of a single long fillet extending the length of the joint. The short fillets are followed by open spaces without a weld, and those open spaces are filled with weld fillets once the interrupted welding is completed for that weld pass.

12 Claims, 1 Drawing Sheet

WELDING PROCESS FOR HARDENABLE OR HARDENED STEEL

CROSS-REFERENCE TO RELATED APPLICATION

This is a continuation-in-part of Ser. No. 07/588,179 filed Sep. 26, 1990 now abandoned.

BACKGROUND OF THE INVENTION

In molding hardenable steel, alloy steel, high alloy steel, high carbon forged steel, bi-metal union (i.e., the welding of two different metals, for example, stainless steel with carbon steel), manganese steel, Hadfield steel and so on, a conventional heat treatment system is necessary before, during, and/or after welding, to normalize the crystallization of the applied weld. Such a heat treatment significantly increases the cost of the final product. Moreover, the size of the part often prevents heat treatment, and therefore the welded part becomes too tough and cannot support the requirements of the part, which causes fissures and cracks which sometimes lead to the breaking of the part.

SUMMARY OF THE INVENTION

The new cold welding process presented with this invention eliminates heat treatment without hardening the applied weld too much, and does not temper the transition area of the applied weld. Therefore, the mechanical and physical characteristics of the base material are preserved, and the deposited weld remains machineable and fileable up to 245 Br., maximum, allowing major designs to be modified by using alloy steels as the types SAE 41.40, 43.30, 43.45, or other kinds of steel with tensile strength above 80 Kg/mm$^2$.

The present process, called "cold welding" because the temperature of the welded parts should never exceed 100° C., eliminates martensitic crystals and dispenses with the heat treatments without hardening the applied weld, and the transition zone also does not change the physical characteristics of the base material. The applied weld can be filed because of the absence of martensitic crystals, and the hardness of the weld does not exceed 245 Br.

DESCRIPTION OF THE DRAWINGS

The invention is described in detail hereinbelow, with reference made to the preferred embodiment shown in the enclosed drawings, as follows.

DETAILED DESCRIPTION OF PREFERRED EMBODIMENT

The invention consists of using specifically selected welding electrodes, namely, AWS-307 electrode (American Welding Society Norm) and AWS-309 electrode, basic or rutilic coating, used to coat the chamfer of the part to be welded. Diameter of the electrode is between 2.5 mm and 3.25 mm. AWS-8018 through AWS-10018 electrodes, basic coating, serves to fill the chamfer. It is not necessary to know the chemical composition of the basic material to be welded.

Welding of the parts should be done alternately using the aforementioned electrode. The welded parts should be chamfered with "U" chamfers, obtained with an emery grinder or a fitted point with round ends. The chamfer must permit complete junction of the two parts while providing space for the several welding coats that are going to connect the two parts.

The chamfered parts should be coated separately using AWS-307 or AWS-309 electrodes. The parts then are placed together and united with the same electrode, so that the length of each fillet is at most 8 to 10 cm with alternate weldings.

Now follows another welding coat with electrode AWS-8018, followed by another welding coat with electrodes AWS-307 or AWS-309 and so on, successively changing the electrodes, until the chamfer is completely filled. The temperature of the two welded parts should not exceed 100° C. This temperature control is achieved during the welding of large workpieces by welding a series of relatively short fillets as mentioned above, instead of a single long fillet extending the length of the joint. To avoid exceeding the maximum temperature of 100° C., it has been found that the length of each fillet should be no more than 10 cm, followed by an open space of 10 cm without a weld, and then followed by another fillet of 10 cm maximum, and so on. When these interrupted weldings are completed, the open spaces are filled with weld fillets. This procedure is known as "intercalation".

The last or, finishing welding coat, should be done with an AWS-307 or an AWS-309 electrode.

To weld thick parts, both sides should be chamfered. Thick parts may be chamfered with a cutting electrode, controlling the temperature of the parts at or below 100° C. with a thermic pencil, and then grinding the chamfer to remove at least 4 mm of material to eliminate the surface layer that changed metallurgical characteristics due to heating by the cutting electrode.

Figure 1:
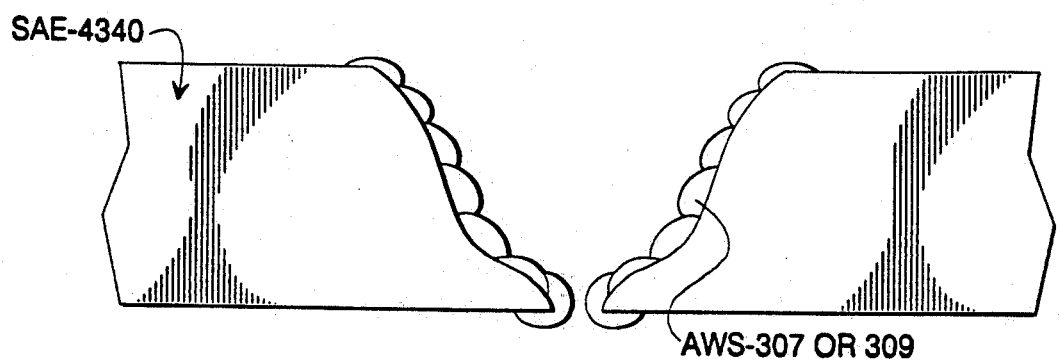
FIG. 1 shows a chamfered joint between steel bars, with the chamfer coated with a 2.5 to 4 mm $\phi$ AWS-307 electrode.
Figure 2:
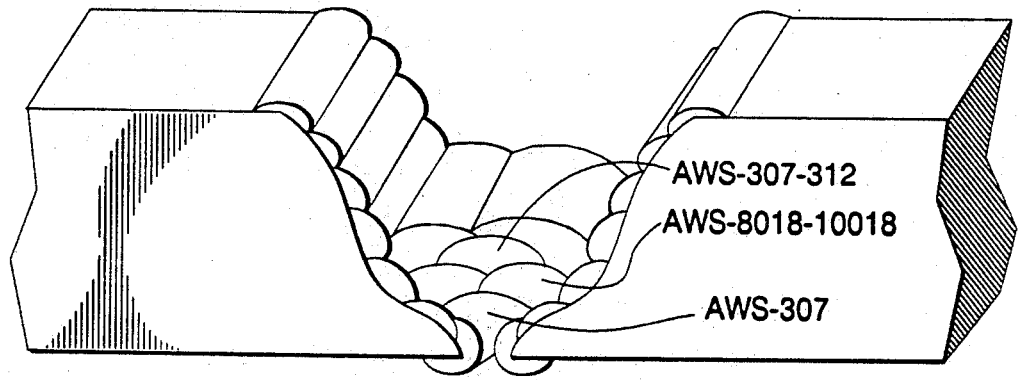
FIG. 2 shows the same bar as in FIG. 1 with the chamfered parts being united with a 4 mm $\phi$ AWS-307 electrode.
Figure 3:
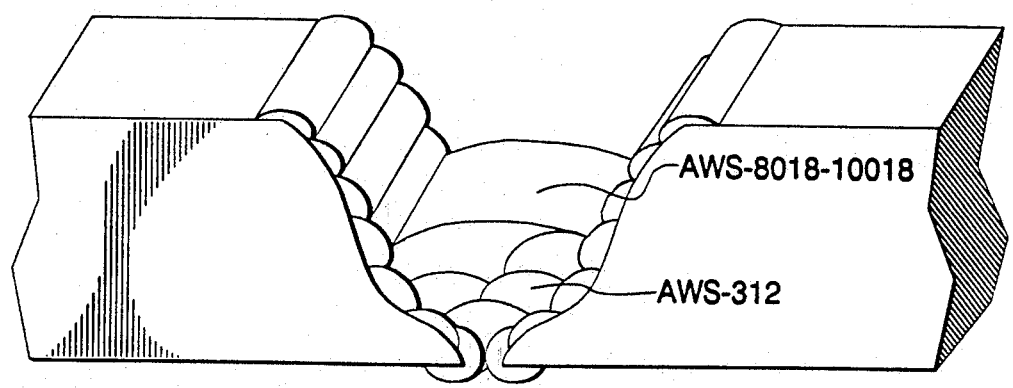
FIG. 3 shows a thick steel part with the chamfer coated and filled with electrodes with capacity above 50 Kg/mm$^2$: AWS-307 electrode, then AWS-10018 followed by a 3.2 mm to 4 mm $\phi$ AWS-312 electrode.

The chamfered parts are then coated separately with AWS-307 (or AWS-309) electrodes, after which the parts are united as shown in FIGS. 2 and 3 and welded with AWS-307 (or AWS-309) electrodes for the first layer. After that first layer, AWS-8018 (or AWS-9018, or AWS-10018) electrodes are used to deposit the second layer, to change the crystallization of the deposited weld.

After the second layer is deposited, there then follows another welding coat with an AWS-307 (or AWS-309) electrodes, followed by another welding coat with the AWS-8018 (or AWS-9018 or AWS-10018) electrodes and so successively further until the welding coats fill up the chamfer. The temperature of the welded parts during these welding steps should not exceed 100° C. The last or finishing welding coat should be done with an AWS-307 (or AWS-309) electrode.

When dealing with parts whose final use requires submission to vibration or many mechanical checks, the superposition of the welding coats will be in the following sequence:

1st (junction) coat: electrode AWS-AWS-307 or AWS-309

2nd coat: electrode AWS-8018 (or AWS-9018 or AWS-10018)

3rd coat: electrode AWS-312

4th coat: electrode AWS-307 (or AWS-309), and so successively until reaching the final coat, which is always done with an AWS-307 or AWS-309 electrode.

It is again emphasized that during the welding of the parts as described above the temperature of the two parts should never exceed 100° C.

What is claimed is:

1. A process for welding parts made of hardenable or hardened steel, comprising the steps of:
   carrying out the welding without any heat treatment; and
   welding in individual fillets not to exceed a predetermined length and separated by open spaces, instead of a single long fillet extending the length of the region being welded; and then
   filling in the open spaces with weld fillets,
   thereby allowing the heat from the welding process to dissipate so as keep the temperature of the parts to a lesser increase than would otherwise occur by welding a single long fillet throughout the length being welded during the whole welding process.

2. The welding process according to claim 1, where the welding is carried out by means of electric welding and with no heat treatment of the workpiece to normalize the crystallization of the applied weld.

3. The welding process according to claim 2 where union of the parts is carried out with AWS-307 or AWS-309 electrodes, and the chamfer is then filled up with one of the following series of welding coats:
   (a) AWS-8018-AWS-307 (or AWS-309)-AWS-8018 AWS-307 (or AWS-309)-AWS-8018- and repeating the series until the chamfer is filled; or
   (b) AWS-8018 (or AWS-9019 or AWS-10018)-AWS-312-AWS-307 (or AWS-309)-AWS-8018 (or AWS-9018 or AWS 10018)-AWS-312- and repeating the series until the chamfer is filled.

4. The welding process according to claim 3, where the final weld is carried out with a 4 mm AWS-307 or AWS-309 electrode.

5. The welding process according claim 1, where AWS-307 or AWS-309 electrodes are used to coat a workpiece chamfered where the welding is being applied.

6. The welding process as in claim 1, wherein the welding is in plural layers within a joint, and wherein the temperature of the parts is heated not to exceed substantially 100° C. by the steps of:
   welding at least some of the layers in said individual fillets not to exceed a predetermined length and separated by open spaces; and then
   filling in the open spaces with weld fillets.

7. The welding process as in claim 6, wherein the length of each open space is substantially the same as each individual fillet.

8. The welding process as in claim 6, wherein the length of each individual fillet and open space does not substantially exceed 10 cm.

9. A process for electric welding a joint between parts made of hardenable or hardened steel, comprising the steps of:
   carrying out the welding without any heat treatment of the parts to normalize the crystallization of the applied weld; and
   joining the parts with at least one fillet of welding, by welding a series of individual fillets in the joint instead of a single long fillet extending the length of the joint, each such individual fillet being followed in the joint by an open space without a weld, and then followed by another individual fillet, and then filling the open spaces with weld fillets to complete a layer of weld fillet in the joint,
   so that the temperature of the parts adjacent the joint is held to a lesser increase than would otherwise occur by welding a single long fillet throughout the the length of the joint.

10. The process as in claim 9, wherein the length of each individual fillet is substantially no more than 10 cm.

11. The process as in claim 9, wherein the length of each individual fillet and open space is substantially no more than 10 cm.

12. The process as in claim 9, wherein the length of each open space is substantially the same as each individual fillet.

* * * * *